INVENTORS
PETER RIECKMANN
HEINZ SCHALK
ECKHARD THEEL

INVENTORS
PETER RIECKMANN
HEINZ SCHALK
ECKHARD THEEL

BY
ATTORNEYS

United States Patent Office 3,395,213
Patented July 30, 1968

3,395,213
SUGAR- AND POLYETHYLENE GLYCOL-COATED DRAGÉES, NONSTICKING TOGETHER, OR TO DRAGÉE-MAKING KETTLES
Peter Rieckmann, Mannheim-Waldhof, Heinz Schalk, Mannheim, and Eckhard Theel, Mannheim-Sandhofen, Germany, assignors to C. F. Boehringer & Soehne, GmbH, Mannheim-Waldhof, Germany, a corporation of Germany
Original application Jan. 16, 1963, Ser. No. 252,275, now Patent No. 3,331,696, dated July 18, 1967. Divided and this application Dec. 5, 1963, Ser. No. 331,638
Claims priority, application Germany, Jan. 20, 1962,
B 65,598
2 Claims. (Cl. 424—32)

ABSTRACT OF THE DISCLOSURE

A novel dragée product as well as a process of the manufacturing of the same are disclosed. The dragée comprises an inner pill center, i.e., a drug, gum or confectionary core, and an outer encapsulating layer comprising a dried admixture of a liquid carrier and from about 1–10 wt.-percent of polyethylene glycol, 40–50 wt.-percent of sugar and 10–20 wt.-percent of solid fillers.

Figure 1:
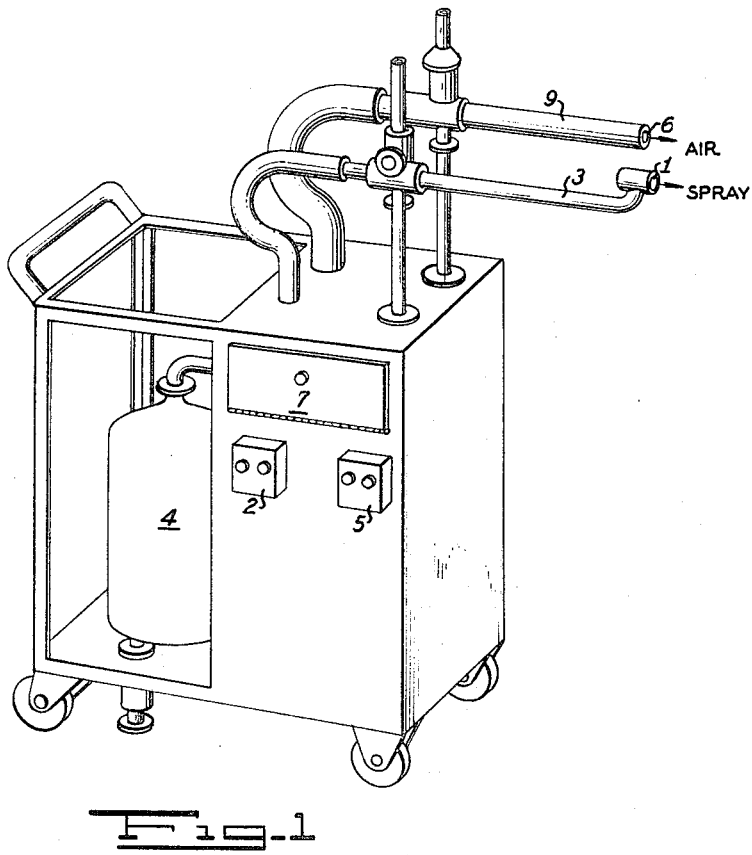

The dragée is produced by the steps of applying to the pill centers a suspension as just described, agitating the pill centers to distribute the suspension uniformly onto the surfaces of the same and then drying the coated centers by contacting the same with heated gas.

---

This application is a division of application Ser. No. 252,275, filed Jan. 16, 1963, issued as U.S. Patent No. 3,331,696.

The present invention relates to a process for the manufacture of dragées and to an apparatus therefor. In one aspect it relates to an automatic process for rapidly manufacturing pharmaceutically acceptable dragées.

It is known that the dragée represents one of the most wide-spread forms in which drugs are administered, and that the administration of drugs in this form is growing in popularity. Dragée preparations are characterized by the advantages that they are easy to ingest and eliminate the bad taste which is characteristic of so many drugs. Furthermore, the dragée is a particularly important vehicle for use in connection with drugs which are sensitive to light, air, and moisture. Still further in the case of drugs which have a disturbing effect on the stomach or which are inactivated in the stomach, special coatings can be applied so that the dragée will not dissolve until it reaches the intestines, resulting in excellent tolerability and permitting the oral administration of drugs not possible in the absence of such coatings. As used herein, the term "dragée" is used in its dictionary sense, i.e., "anything sugar-coated as a pill" (Funk & Wagnall's New Standard Dictionary of the English Language, p. 756, 1942 Funk & Wagnall's Co.; (1a) a sugar-coated nut, (1b) a silver-covered candy for decorating cakes, (2) a sugar-coated medicated confection" (Webster's Seventh New Collegiate Dictionary, p. 251, 1963, G. & C. Merriam Company.)

The manufacture of dragées suitable for commercial utilization involves many difficulties. As heretofore carried out, it is a manual art requiring much practice, skill, and experience. The pill or center coming from the tablet forming machine has first applied thereto where necessary, isolation coatings which act to protect the pharmaceutical substances from external influences. The pill or center is then coated with a sugar syrup of a certain composition and thereafter with mixtures of talc, chalk and like solid fillers. This process has to be repeated several times in order to apply to the pill as quickly as possible sufficient material to produce on the dragée edges which are rounded. However, the surface of the pill so obtained is not smooth and has to be smoothed out in further steps, using therefor both sugar syrups and powdered sugar. The smoothing step is followed by coloring steps, whereby a uniformly colored dragée is achieved only following the application of many coats of colored sugar syrup. Finally the dragées are waxed or glazed. Between each of the individual steps in the process, the dragées are taken from the coating treatment kettle and dried in large drying machines or ovens so that the moisture necessary in connection with the coating applications cannot penetrate through the covering and damage the drugs forming the center or core.

The process as described above requires a great deal of hand work by experienced personnel. A particularly serious disadvantage is the need to keep the dragées in motion in the kettle by stirring them by hand until they no longer stick to one another or to the kettle. Another difficulty lies in that the process consumes an enormous amount of time. The dragées are required to spend a total of about two days' time in the kettle with additional time for periodic interruptions required for drying between each step in the process. In all a total of 8 to 10 days' production time is required for producing each batch of dragées.

Methods for rapidly coating pill centers formed of gum, candy or medicinal materials have become known in recent years in connection with which it has been proposed that all of the substances to be applied to the pills be combined in a single, sugar-coating suspension. Such a process has, for example, been described in German Patent 1,000,569 and is carried out using a coating suspension consisting of water, sugar, starch and sodium cellulose glycolate with heat. While this process has been somewhat successful, it has not gained widespread usage as it produces satisfactory results only if the coating process is constantly supervised (see Gairner "Grundstoffe und Verfahren der Arzneibereitung," Verlag F. Enke, Stuttgart, 1960, page 61). The constant supervision required represents a considerable disadvantage in comparison with the conventional coating process described hereinbefore in which the kettles do not have to be kept under constant supervision and observation.

Other rapid coating rapid processes have been proposed which are based upon the complete elimination of the use of sugar, the coating being performed, for example, using alcoholic solutions of polyethylene glycol (see Gairner, loc. cit., page 62). Polyethylene glycols, however, have the significant short coming that they are particularly bad tasting. The use of dragées produced with alcoholic solutions of polyethylene glycol is disagreeable to the patient and therefore do not offer the advantages associated with this form of drug administration.

It is accordingly the general object of the present invention to provide a method for the manufacture of dragées having centers formed of gum, candy or medicinal materials which are of a purity surface, smoothness, taste, and color suitable for commercial use in an economically feasible manner.

Another object of the invention is to provide a method for the manufacture of dragées which are of a purity, surface smoothness, taste, and color which makes their use convenient and inexpensive without any disagreeableness to the patient who has to take repeated doses of the pharmaceutical contained in the dragée.

Still another object of the invention is to provide a substantially automatc method for the manufacture of dragées.

Still another object of the invention is to provide a rapid method for the manufacture of dragées.

Still a further object of the invention is to provide an apparatus for the manufacture of dragées which are of a purity, surface smoothness, taste, and color suitable for commercial use.

It is still another object of the invention to provide dragées, i.e. an improved vehicle for therapeutic compositions being characterized by stability, surface smoothness, pleasant taste, etc., and whereby the full effect of the therapeutic mechanism can be carried out when the composition is administered orally.

Still a further object of the invention is to provide coating suspensions for coating dragées, containing polyethylene glycol in addition to sugar and filler materials in aqueous suspension.

Figure 2:
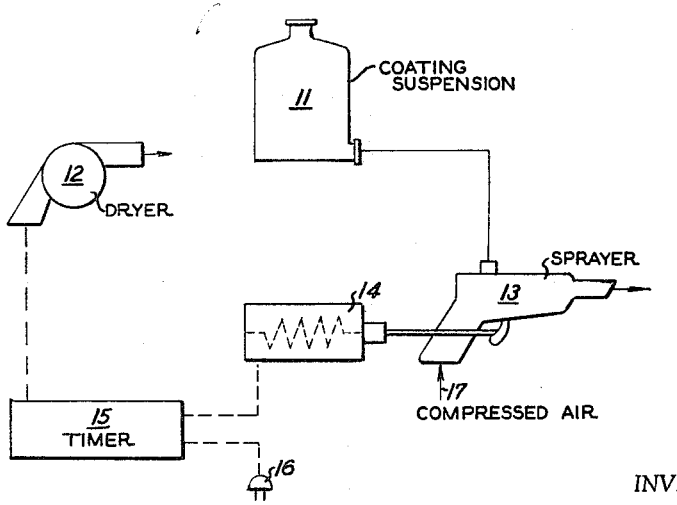
Figure 3:
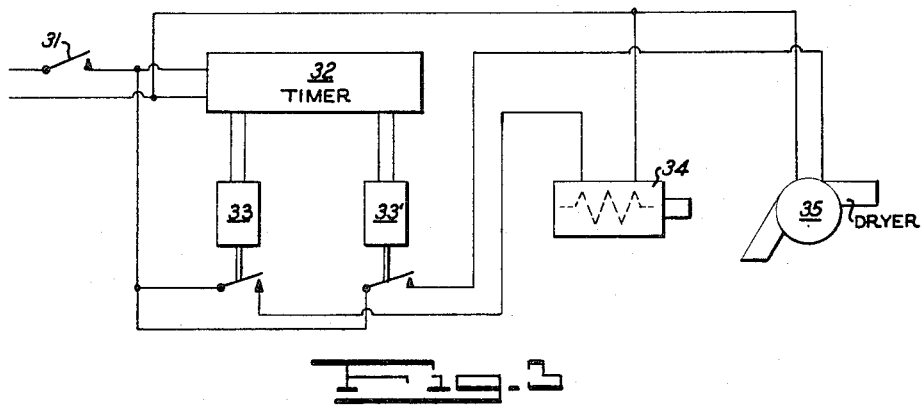
Figure 4:
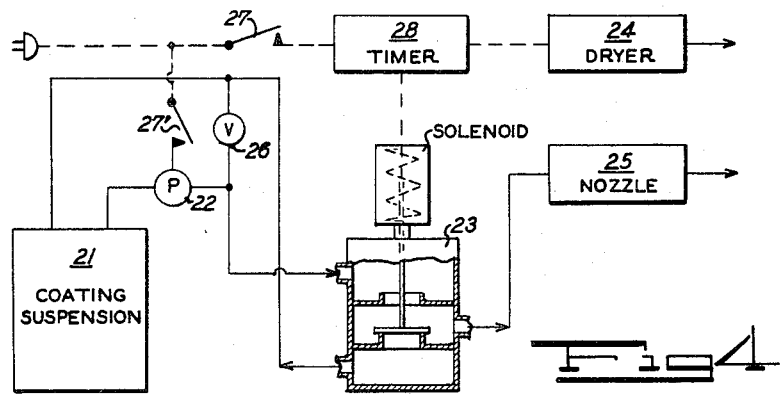
Figure 5:
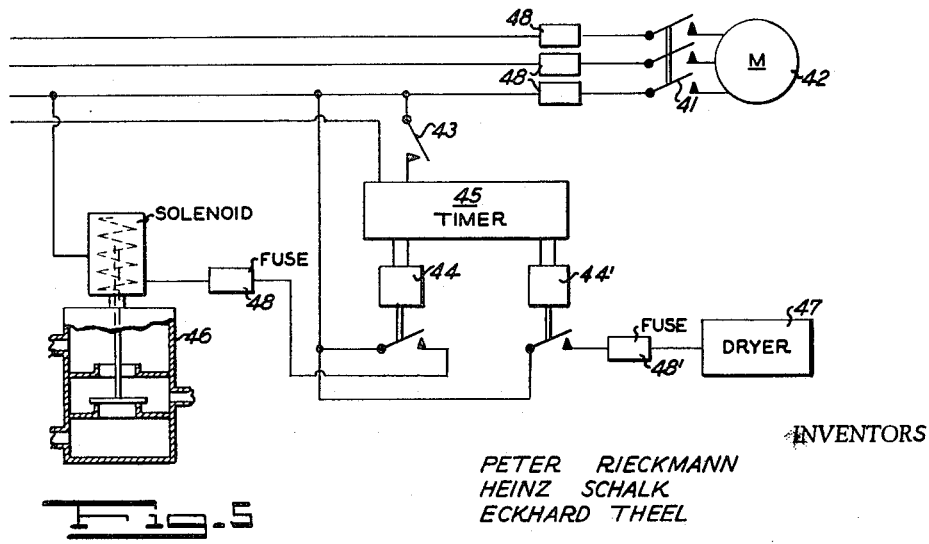

Other and further objects and advantages of the invention will become apparent to one skilled in the art upon referring to the accompanying disclosure and the drawing in which:

FIG. 1 is a schematic illustration of one preferred embodiment of the apparatus of the invention, FIG. 2 is a schematic illustration of another preferred embodiment of the apparatus of the invention, FIG. 3 is a diagrammatic representation of the wiring of an embodiment of the apparatus shown in FIG. 2, FIG. 4 is a schematic illustration of another preferred embodiment of an apparatus of the invention showing in particular the use of a hand dryer as a source for heated air, and FIG. 5 is a diagrammatic representation of the wiring of the embodiment of FIG. 4.

In accordance with the present invention a fully automatic rapid method for the production of dragées having centers formed of gum, candy or medicinal materials characterized by pleasant taste, smoothness of surface, and perfect color has now been found. It has been found according to the invention that when pill centers or cores are coated using an aqueous-sugar coating suspension containing 1–10 weight percent of polyethylene glycol in addition to 40–50 weight percent of sugar and 10–20 weight percent of solid fillers, dragées are obtained characterized by the properties as just set out. In preparing the dragées, the coating suspension is sprayed onto the pills or centers maintained in rotation in a coating kettle, the spraying interrupted and the sprayed dragée centers maintained in rotation for a period of time and thereafter the coated centers dried with a current of warm air. These three steps in the sequence as set out as repeated, if necessary, until the desired total amount of coating suspension has been applied.

In this way and namely by the incorporation according to the invention of a small amount of polyethylene glycol in a sugar-containing coating suspension, the tendency to stickiness at the start of the drying of the suspension is overcome, that is the dragées do not stick to one another nor do they adhere to the kettle wall. There is, as a result, made possible a rapid, fully automatic pill center coating process. The invention makes possible for the first time the possibility in a single operation to apply the coating suspension onto the pill center and to dry the same thereon. In the process as herein taught, the need for handwork is eliminated other than that which is required for adjusting the equipment at the beginning and at the end of the process. Further, the requirement for experienced technicians to carry out the process is eliminated. Furthermore, drying ovens are no longer required whereby the frequent transporting of the dragées from the kettle to the drying oven and back which represents a serious disadvantage of the coating processes as conventionally practiced is eliminated. A further considerable advantage of the instant process is that the time required for production of a batch of dragées amounts to only about one day. In connection with the production time, it should be noted that the capacity per kettle is many times that of the conventionally practiced process. Thus, whereas in the known conventional method, the kettle charge was limited to that amount which could be kept broken up and moving by hand, the kettle in accordance with the invention can be filled to its maximum capacity.

A special advantage stemming from the process of the invention lies in the fact that each coating which is applied is a relatively thin coating, is dried immediately and consequently no penetration of moisture into the center during the coating process takes place. Since smooth coatings are formed from the start, the total or over-all coating can also be much thinner than usual. The coatings in accordance with the invention amount to approximately up to 1½ times the weight of the center where formerly the coatings amounted to about twice the weight of the center.

The coating suspensions of the invention per se are novel and can be produced very simply without heat merely by stirring the components together and homogenizing the resultant suspension, for example in a corundum disk mill or the like. In table 1, which follows, illustrative examples of a number of coating suspensions according to the present invention are set out. It is possible in accordance with the invention to add coloring material from the start of the process if desired, thus achieving a uniform coloration of the dragées.

TABLE 1

| Example | 1 | 2 | 3 | 4 | 5 | 6 | 7 | 8 | 9 | 10 |
|---|---|---|---|---|---|---|---|---|---|---|
| Sugar | 46 | 45 | 45 | 45 | 46 | 46 | 46 | 45 | 50 | 50 |
| Carbowax [1] 6000 | 4 | | | | 5 | | 4 | | 4 | |
| Carbowax [1] 20000 | | 5 | 5 | | 4 | | | 4.5 | | 4 |
| Starch syrup | | 2.5 | 2.5 | 2 | | 2 | 2 | 2 | | 2 |
| Gum arabic | | | 0.5 | 1 | 1 | | | 0.5 | | |
| Chalk | 15 | 10 | 6 | 8 | | | | | 10 | 6 |
| Kaolin | | | 6 | | 10 | 12 | 10 | 6 | 4 | 6 |
| Talcum | | | | | 5 | 3 | | 6 | | |
| Titanium oxide | 5 | 2.5 | | | 4 | 3 | | | 2 | 2 |
| Tricalcium phosphate | | | | | | | 8 | 6 | | |
| Coloring [2] | Q.s. | Q.s. | Q.s. | Q.s. | Q.s. | Q.s. | Q.s. | Q.s. | Q.s. | Q.s. |
| Water to make | 100 | 100 | 100 | 100 | 100 | 100 | 100 | 100 | 100 | 100 |

[1] Trade name of polyethylene glycol.
[2] = Quantum sufficit.

The following examples illustrate satisfactory procedures for the manufacture of dragées, but it is to be understood that they are presented only for the purpose of illustration and not as indicating the limits of the invention.

Example 1

8 kilograms of dragée centers of 6 mm. diameter (weight of centers 80 mg., number of centers 100,000) are introduced into a kettle having a 60 cm. diameter provided with a powerful exhaust system. The spraying system is adjusted so that about 80 ml. of the coating suspension are sprayed onto the centers within a period of 25 seconds in each of the coating steps. The centers are circulated, i.e., rotated for 1.5 minutes following the spraying without any external interference so that the suspension can be uniformly distributed on the surface of the dragées. The batch is then dried with a current of hot air for 2 minutes. These three steps are repeated until 8.5 kg. of suspension have been applied. The coating suspension employed is one in accordance with the invention containing polyethylene glycol in addition to sugar and solid fillers. The dragées which have had smooth coatings from the start of the procedure are now ready for waxing. The total production time amounts to about 6.5 to 7 hours and no supervision of any kind is required in this period. After the coating has been completed, the dragées have a weight of 130 mg. The coating dissolves in the Erweka disintegration tester in about 4 minutes which is comparable with a very good candy coating as formed by the process as used hitherto.

Examples 2–5

The process of Example 1 was repeated, the data and results of these coating operations as carried out in accordance with the process of the invention are set out in Table 2 which follows:

TABLE 2

| Dragée Centers* | | | | 1 spray coating | | | Kettle Diameter (cm.) | Time per spray coating (sec.) | | | | Total Candy Coating Time (hrs.) |
|---|---|---|---|---|---|---|---|---|---|---|---|---|
| Diam., mm. | Wt., mg. | Number | Total Wt. | Dragée Wt. (mg.) | Suspension (ml.) | Dry Weight (g.) | | Spraying (a) | Pause (b) | Drying (c) | a+b+c | |
| 6 | 80 | 100000 | 8 | 130 | 80 | 56 | 60 | 25 | 90 | 120 | 235 | 6.5–7 |
| 6 | 80 | 100000 | 8 | 115 | 60 | 42 | 60 | 5 | 55 | 120 | 180 | 6.5–7 |
| 10 | 330 | 120000 | 39.6 | 500 | 500 | 350 | 100 | 12 | 90 | 138 | 240 | 4 |
| 9 | 360 | 120000 | 43.2 | 560 | 450 | 315 | 100 | 11 | 90 | 109 | 210 | 4 |

*Formed of gum, candy or medicinal materials.

The rapid, fully automatic process of the invention can preferably be carried out using the novel apparatus taught in accordance with the invention.

Referring to FIG. 1, the apparatus according to the invention which is particularly suitable for carrying out the fully automatic coating process consists of three separate systems:

(A) A spraying system composed of a spraying nozzle 1 which is connected by conduits 3, suitable valves or pumping switches 2 to a supply tank 4 containing the coating suspension;
(B) A source of heated air 6 provided with suitable switches and conduits 5 and 9 respectively; and
(C) An electrical control apparatus composed of a timer mechanism 7.

In one embodiment of the invention are shown in FIG. 2 a spray gun 13 such as is conventionally used for spray painting is used for spraying the coating suspension. The advantage of using a spray gun of this type is based on the fact that it is provided with a proportioning valve so that different amounts of coating suspension can be applied at a constant time setting. A possible disadvantage, however, is that compressed air is required to be used therewith resulting in the formation of mists which are removed from the system through an exhaust line and representing suspension not deposited on the dragées.

Another possible disadvantage is that spray guns are not self-feeding so that the coating suspension has to be fed positively to the gun as for example by gravity (FIG. 2), i.e. from the vessel 11 downwardly through suitable conduits to the gun 13.

The wiring diagram showing the relationship of the timer mechanisms 17 to the remaining apparatus of FIG. 2 is shown in FIG. 3.

For these reasons, it has proven advantageous to supply the coating suspension at a pressure of 10 atmospheres using therefor a gear pump. As shown in FIG. 4, by means of an electrically controlled three-way valve 23, the coating suspension maintained under pressure in vessel 21 is either fed to the spray nozzle 25 or is carried back through an over-pressure valve 26 into the supply vessel 21. Although the coating suspension of the invention generally is not inclined to settle out, it has nevertheless proven advantageous to avoid any possible formation of sediment by agitating the suspension. Under the circulation produced by the gear pump, of course, no other agitating system is required. The electrical control of the spray gun is carried out by means of a solenoid 23 which actuates the trigger resulting in spraying. If a gear pump and spray nozzle are used, the control is carried out by means of commercially available magnetic three-way valves.

A hair dryer, as shown in the embodiment of FIGS. 2 and 3, for example, can be used as a hot air source for small kettles. Even for large kettles, the output of a standard hand dryer is adequate (see FIGS. 4 and 5). Of course, any other hot air source can be used for drying as long as it provides the assurance that the temperature and rate of flow of the air are constant.

The timing regulation for the apparatus described above is carried out in a known manner utilizing the conventionally available electrical timers. These contain, for example, revolving cams which open and close the necessary contacts. It has proven advantageous, however, to be able to adjust accurately the spraying time, the inactive period, and the drying time, and this is done by means of three-time switching mechanisms. When separate switching mechanisms are used, the running time can be adjusted during operation which is not directly possible in the case of cam-operated timers.

The apparatus described above can, if desired, be combined into a very practical readily movable unit as has been shown in FIG. 1. The apparatus is connected with single-phase or three-phase current source by means of a single cable. If the hot air unit is not built in, a control line is required for the hot air in-feed.

As used herein, and in the claims, the term "Carbowax" designates the trade name of a group of non-volatile, solid, polyethylene glycols, soluble in both water and aromatic hydrocarbons and which are manufactured by Carbide and Carbon Chemical Company, a division of Union Carbide and Carbon Corporation of New York City, N.Y. Carbowaxes are supplied in various grades, the grades being designated by numerals as shown in the specification. Increasing grade numbers indicate increasing molecular weights.

Illustrative examples of the coating suspensions according to the present invention have been shown in Table 1. Of course, many changes and variations in the components may be made by those skilled in the art in accordance with the principles set forth herein. Naturally, we make the limiting statement to the effect that the components of the coating suspension must be non-toxic, at least in the amounts in which the same are employed.

The preferred procedure for the manufacture of dragées according to the present invention has been shown in Examples 1–5. Of course, many changes in the reaction conditions, temperature and duration may be made by those skilled in the art in accordance with the principles set forth herein. The drying of the dragées is effected by means of hot air of 100–120° C. preferably. In case that the dragée center may contain some heat sensitive material, the drying may be effected also at lower temperatures, whereby the duration of that step will last longer, naturally. In general, the time ranges for each of the steps of the coating process according to the present invention depend on the size of the kettle as well as that of the dragée centers, of the humidity of the atmosphere and the like conditions. Preferably, the spraying step has a duration of 5–50 sec., the pause 10–100 sec. and the drying step 50–200 sec.

The apparatus for effecting the manufacture of the dragées according to the present invention is composed of a number of parts known per se. However, as special arrangement of those components—as shown in the accompanying drawings—is necessary to guarantee an absolutely perfect coating process.

We claim:
1. A dragée which will not stick together with other dragées or adhere to the walls of dragée making kettles, consisting of an inner confectionery or pharmaceutical drug pill center with an outer medicinal free sugar coating consisting of a dried homogeneous aqueous suspension of a liquid carrier and from 1–10 weight percent of polyethylene glycol having a molecular weight of from 6000–20,000, 40–50 weight percent of sugar and 10–20 weight percent of at least one solid filler selected from the group consisting of starch, gum arabic, chalk, kaolin, talc, titaniumdioxide and alkaline earth metal phosphates.

2. A dragée according to claim 1 additionally containing a colorant.

References Cited
UNITED STATES PATENTS

| | | | |
|---|---|---|---|
| 312,041 | 2/1885 | Upjohn | 167—82 XR |
| 1,559,412 | 10/1925 | Franzen | 99—134 |
| 1,629,461 | 5/1927 | Berg et al. | 99—135 |
| 2,262,087 | 11/1941 | Bartlett et al. | 167—82 |
| 2,928,770 | 3/1960 | Bardani | 167—82 |
| 2,991,226 | 7/1961 | Millar et al. | 167—82 |
| 3,295,992 | 1/1967 | Frey | 99—134 |
| 3,295,992 | 1/1967 | Frey | 99—134 |

LEWIS GOTTS, *Primary Examiner.*

S. K. ROSE, *Assistant Examiner.*

UNITED STATES PATENT OFFICE
CERTIFICATE OF CORRECTION

Patent No. 3,395,213　　　　　　　　　　　　　　　July 30, 1968

Peter Rieckmann et al.

It is certified that error appears in the above identified patent and that said Letters Patent are hereby corrected as shown below:

Column 3, line 63, "as repeated" should read -- are repeated --. Column 5, line 42, "are shown" should read -- as shown --. Column 8, line 11, cancel "3,295,992  1/1967  Frey---99-134" and insert　　　　　OTHER REFERENCES
　　　Gillham et al., Pharm. J. 162:472 June 25, 1949
　　　Lesser, Drug & Cosm. Ind. 69(3):399 Sept. 1951
　　　Gans et al J. Am. Pharm. Ass'n, Sci. ed. 43(8): 483-485
　　　Aug. 1954

Signed and sealed this 9th day of December 1969.

(SEAL)
Attest:

Edward M. Fletcher, Jr.　　　　　　　　　　　WILLIAM E. SCHUYLER, JR.
Attesting Officer　　　　　　　　　　　　　　　Commissioner of Patents